(12) United States Patent
Munetomo

(10) Patent No.: US 11,630,634 B2
(45) Date of Patent: Apr. 18, 2023

(54) CONTENT REPRODUCTION SYSTEM, CONTENT REPRODUCTION METHOD, AND RECORDING MEDIUM WITH CONTENT REPRODUCTION PROGRAM RECORDED THEREON

(71) Applicant: SHARP KABUSHIKI KAISHA, Sakai (JP)

(72) Inventor: Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/512,596

(22) Filed: Oct. 27, 2021

(65) Prior Publication Data
US 2022/0147299 A1    May 12, 2022

(30) Foreign Application Priority Data

Nov. 10, 2020   (JP) .............................. JP2020-187332

(51) Int. Cl.
   *G06F 3/147*    (2006.01)
   *G09F 9/30*    (2006.01)
   *H04L 67/10*    (2022.01)

(52) U.S. Cl.
   CPC ................ *G06F 3/147* (2013.01); *G09F 9/30* (2013.01); *H04L 67/10* (2013.01)

(58) Field of Classification Search
   CPC ............. G06F 3/147; G09F 9/30; H04L 67/10
   USPC .......................................... 345/2.1; 715/234
   See application file for complete search history.

(56) References Cited

U.S. PATENT DOCUMENTS

| | | | | |
|---|---|---|---|---|
| 7,631,192 | B1* | 12/2009 | Matsuo | H04N 21/42209 713/168 |
| 2009/0265741 | A1* | 10/2009 | Kinoshita | H04N 21/4725 725/43 |
| 2013/0141441 | A1 | 6/2013 | Shimizu | |
| 2014/0164908 | A1* | 6/2014 | Gondo | G06F 16/9574 715/234 |
| 2014/0172540 | A1* | 6/2014 | Lee | G06Q 30/0242 705/14.41 |
| 2018/0067517 | A1* | 3/2018 | Sasaki | H04L 67/025 |
| 2019/0075370 | A1* | 3/2019 | Kim | H04N 21/6582 |
| 2020/0296498 | A1* | 9/2020 | Park | H04W 4/80 |

FOREIGN PATENT DOCUMENTS

JP          2013-117603 A          6/2013

\* cited by examiner

*Primary Examiner* — Prabodh M Dharia
(74) *Attorney, Agent, or Firm* — ScienBiziP, P.C.

(57) ABSTRACT

A content reproduction system for reproducing content on a display device installed at a predetermined location in accordance with a predetermined reproduction schedule includes a user information acquiring circuit that acquires user information from a user terminal, a content acquiring circuit that acquires first content corresponding to the user information acquired by the user information acquiring circuit and a first reproduction schedule for reproducing the first content, and a display circuit that causes the user terminal to display the first content acquired by the content acquiring circuit, in accordance with the first reproduction schedule.

11 Claims, 11 Drawing Sheets

| USER ID | USERNAME | PASSWORD | BUSINESS OPERATOR ID | AFFILIATED GROUP ID |
|---|---|---|---|---|
| HD0001 | U1 | ***** | TN001 | GID0001 |
| HD0002 | U2 | ***** | TN001 | GID0002 |
| OK0001 | U3 | ***** | TN002 | GID0003 |
| OK0002 | U4 | ***** | TN002 | GID0004 |
| HS0001 | U5 | ***** | TN003 | GID0005 |
| HS0002 | U6 | ***** | TN003 | GID0006 |

| BUSINESS OPERATOR ID | BUSINESS OPERATOR NAME | DISTRIBUTION DEVICE ADDRESS |
|---|---|---|
| A | XX CO, LTD. | haishin001.XX.jp |
| B | YY CO, LTD. | haishin002.YY.jp |
| C | ZZ CO, LTD. | haishin003.ZZ.jp |

| AFFILIATED GROUP ID | AFFILIATED GROUP NAME | POSITION INFORMATION | BUSINESS OPERATOR ID |
|---|---|---|---|
| GID0001 | HIROSHIMA PLANT | 34.45****, 132.70**** | TN001 |
| GID0002 | SAKAI HEAD OFFICE | 34.59****, 135.43**** | TN001 |
| GID0003 | YAO PLANT | ... | TN002 |
| GID0004 | FUJIIDERA PLANT | ... | TN002 |
| GID0005 | MAKUHARI BUILDING | ... | TN003 |
| GID0006 | TOYOSU BUILDING | ... | TN003 |

| DISPLAY DEVICE ID | IP ADDRESS | AFFILIATED GROUP ID |
|---|---|---|
| A-001 | 192.168.0.111 | GID0001 |
| A-002 | 192.168.0.112 | GID0002 |

| DATE | START TIME | END TIME | PLAYLIST ID | DESTINATION (AFFILIATED GROUP) ID |
|---|---|---|---|---|
| 2020/3/19 | 8:00 | 23:59 | t200319-001 | GID0001 |
| 2020/3/19 | 9:00 | 23:59 | t200319-002 | GID0002 |

FIG. 10

| PLAYLIST ID | CONTENT FILE NAME(1) | DISPLAY TIME(1) | CONTENT FILE NAME(2) | DISPLAY TIME(2) | ... | CONTENT FILE NAME(n) | DISPLAY TIME(n) |
|---|---|---|---|---|---|---|---|
| t200319-001 | NOTICE (HIROSHIMA)-001.pdf | 30 SECONDS | DINING HALL MENU IN APRIL.jpg | 20 SECONDS | ... | ... | ... |
| t200319-002 | NOTICE (SAKAI)-002.pdf | 1 MINUTE | | | | | |

XX CO., LTD., HIROSHIMA PLANT

DUE TO TYPHOON APPROACHING TODAY, ALL EMPLOYEES ARE REQUESTED TO LEAVE THE OFFICE AT 12:00

XX CO., LTD., SAKAI PLANT

DUE TO TYPHOON APPROACHING TODAY, ALL EMPLOYEES ARE EXCUSED FROM WORK ALL DAY

CONTENT REPRODUCTION SYSTEM, CONTENT REPRODUCTION METHOD, AND RECORDING MEDIUM WITH CONTENT REPRODUCTION PROGRAM RECORDED THEREON

INCORPORATION BY REFERENCE

This application is based upon and claims the benefit of priority from the corresponding Japanese Patent Application No. 2020-187332 filed on Nov. 10, 2020, the entire contents of which are incorporated herein by reference.

BACKGROUND

The present disclosure relates to a content reproduction system and a content reproduction method for reproducing content, and a recording medium with a content reproduction program recorded thereon.

A content reproduction system called digital signage installed in public facilities and reproducing content such as advertisements has been known. Such a content reproduction system usually reproduces the content on a display device (display) installed at a predetermined location in accordance with a predetermined reproduction schedule.

When the content reproduction system is installed in a business facility of a company, for example, users (employees, etc.) view the content on a display device installed at a predetermined location in the business facility. To acquire the content provided from the business facility, the users need to come to the location where the display device is installed, and other users who are located at remote places away from the installation location may not be able to acquire the content.

SUMMARY

It is an object of the present disclosure to provide a content reproduction system that allows a user who is located at a remote place away from a display device, which is installed at a predetermined place and displays content, to acquire the content, a content reproduction method, and a recording medium with a content reproduction program recorded thereon.

A content reproduction system according to an aspect of the present disclosure is a content reproduction system that reproduces content on a display device installed at a predetermined location in accordance with a predetermined reproduction schedule, including a user information acquiring circuit that acquires user information from a user terminal, a content acquiring circuit that acquires first content corresponding to the user information acquired by the user information acquiring circuit, and a first reproduction schedule for reproducing the first content, and a display circuit that causes the user terminal to display the first content acquired by the content acquiring circuit on the user terminal, in accordance with the first reproduction schedule.

A content reproduction method according to another aspect of the present disclosure is a content reproduction method for reproducing content on a display device installed at a predetermined location in accordance with a predetermined reproduction schedule, the content reproduction method causing one or more processors to execute operations including acquiring user information to acquire user information from a user terminal, acquiring content to acquire first content corresponding to the user information acquired in the step of acquiring the user information, and to acquire a first reproduction schedule for reproducing the first content, and displaying the first content acquired in the step of acquiring the content on the user terminal according to the first reproduction schedule.

A recording medium according to still another aspect of the present disclosure is a non-transitory computer-readable recording medium with a content reproduction program recorded thereon, causing a display device installed at a predetermined location to reproduce content in accordance with a predetermined reproduction schedule and causing one or more processors to execute operations including acquiring user information to acquire user information from a user terminal, acquiring content to acquire first content corresponding to the user information acquired in the step of acquiring the user information, and to acquire a first reproduction schedule to reproduce the first content, and displaying the first content acquired in the step of acquiring the content on the user terminal in accordance with the first reproduction schedule.

According to the present disclosure, a user located at a remote place away from a display device installed at a predetermined location can acquire the content.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 illustrates an example of user information registered in a management server according to the embodiment of the present disclosure;

FIG. 4 illustrates an example of business operator information registered in the management server according to the embodiment of the present disclosure;

FIG. 5 illustrates an example of affiliated group information registered in the management server according to the embodiment of the present disclosure;

FIG. 8 illustrates an example of display device information registered in a content distribution device according to the embodiment of the present disclosure;

FIG. 9 illustrates an example of schedule information registered in the content distribution device according to the embodiment of the present disclosure;

FIG. 10 illustrates an example of playlist information registered in the content distribution device according to the embodiment of the present disclosure;

FIG. 11 illustrates an example of a display screen of a display device according to the embodiment of the present disclosure;

FIG. 12 illustrates an example of the display screen of the display device according to the embodiment of the present disclosure;

DETAILED DESCRIPTION

An embodiment of the present disclosure will be described below with reference to the accompanying drawings. The following embodiment is merely an example that embodies the present disclosure, and is not intended to limit the technical scope of the present disclosure.

A content reproduction system 100 of the present embodiment is a system for reproducing content on a display device (display) installed at a predetermined location in accordance with a predetermined reproduction schedule. For example, the content reproduction system 100 is applied to a system for displaying (reproducing) content (signage information) including images and sounds, such as messages and advertisements, in various places such as business facilities, stores, stations, and streets. The present embodiment is described by taking a case where the content reproduction system 100 is applied to a business operator such as an enterprise or the like as an example.

Figure 1:
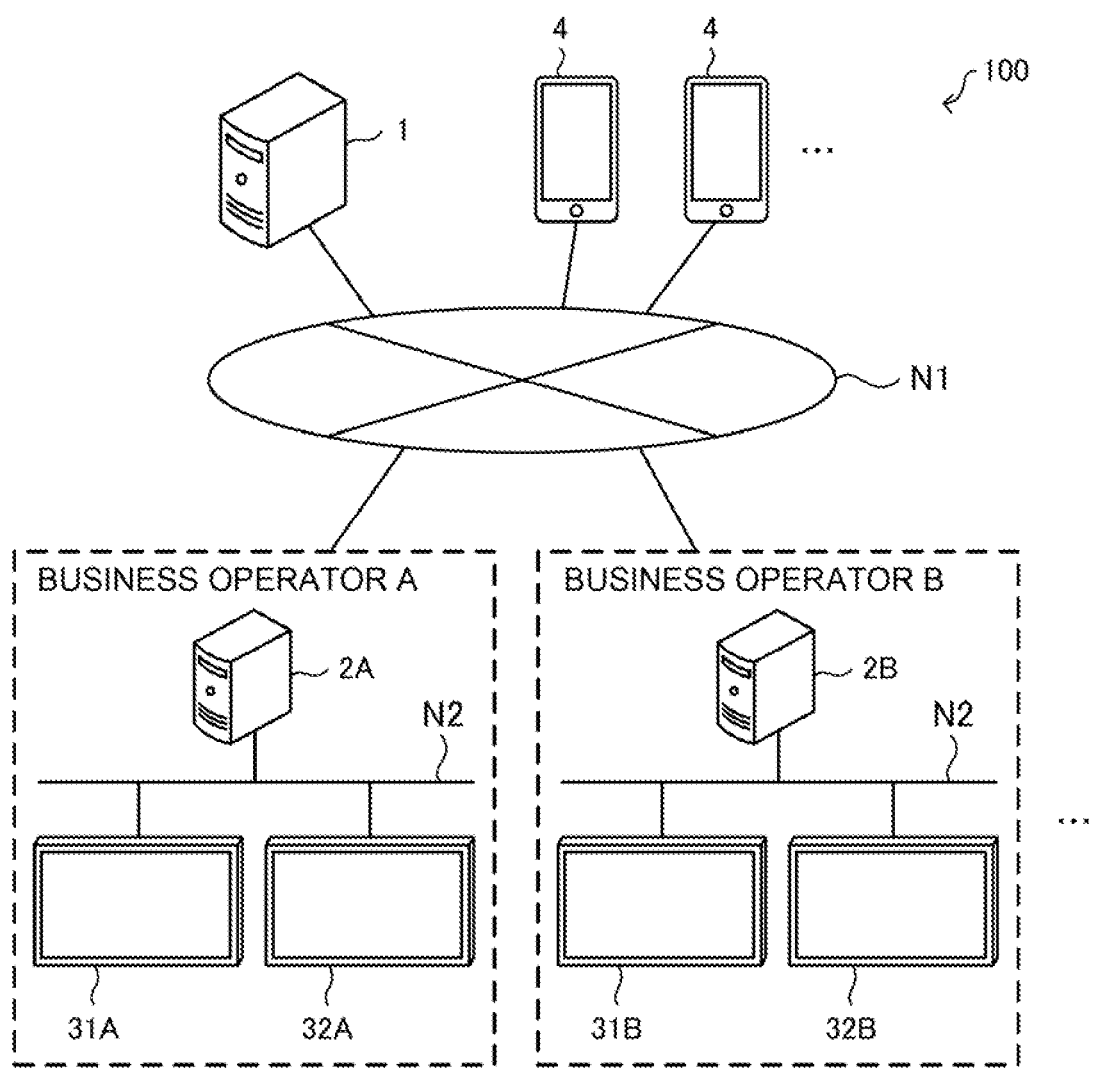
FIG. 1 is a schematic diagram illustrating a schematic configuration of a content reproduction system according to an embodiment of the present disclosure.

FIG. 1 illustrates a schematic configuration of the content reproduction system 100 according to an embodiment of the present disclosure. The content reproduction system 100 includes a management server 1, a content distribution device 2 (e.g., a content distribution device 2A), a display device 3 (e.g., a display device 31A), and a user terminal 4. The management server 1, the content distribution device 2, and the user terminal 4 are communicably connected via a network N1. The content distribution device 2 and the display device 3 are communicably connected via a network N2. The network N1 is a communication network like, for example, the Internet. The network N2 is a communication network, for example, a wireless or wired local area network (LAN) or the like.

The content reproduction system 100 may include a plurality of content distribution devices 2 and a plurality of user terminals 4. The plurality of display devices 3 may be connected to the content distribution device 2. The management server 1 manages a plurality of content distribution devices 2. In the present embodiment, the content reproduction system 100 includes a content distribution device 2A (example of a first content distribution device in the present disclosure) installed at a business operator A (example of a first group in the present disclosure) and a content distribution device 2B (example of a second content distribution device in the present disclosure) installed at a business operator B (example of a second group in the present disclosure). The content distribution device 2A is connected to a display device 31A (example of a first display device in the present disclosure) of a first affiliated group installed at a first business facility (first location) of the business operator A, and a display device 32A (example of the first display device in the present disclosure) of a second affiliated group installed at a second business facility (second location) of the business operator A. The content distribution device 2B is connected to a display device 31B (example of a second display device in the present disclosure) of a third affiliated group installed at a third business facility (third location) of the business operator B, and a display device 32B (example of the second display device in the present disclosure) of a fourth affiliated group installed at a fourth business facility (fourth location) of the business operator B.

Thus, the content reproduction system 100 may include the plurality of display devices 3 installed at different locations and reproduce different kinds of content. The plurality of display devices 3 may be installed in correspondence with each affiliated group of users.

The users are employees of a certain business operator and belong to a certain business facility. The user carries a user terminal 4 and can perform various tasks using the user terminal 4. For example, a user who belongs to the first facility of the business operator A can start a dedicated application (business application of the business support service) installed in the user terminal 4 to view content (signage information) distributed by the first business facility on the user terminal 4, register attendance information, or participate in a web meeting. The content is the information that the content distribution device 2 distributes to the display device 3 for reproduction, and the user can view the same content that is reproduced on the display device 3 of the user terminal 4.

In the following, a specific configuration of the content reproduction system 100 is described.

Management Server 1

Figure 2:
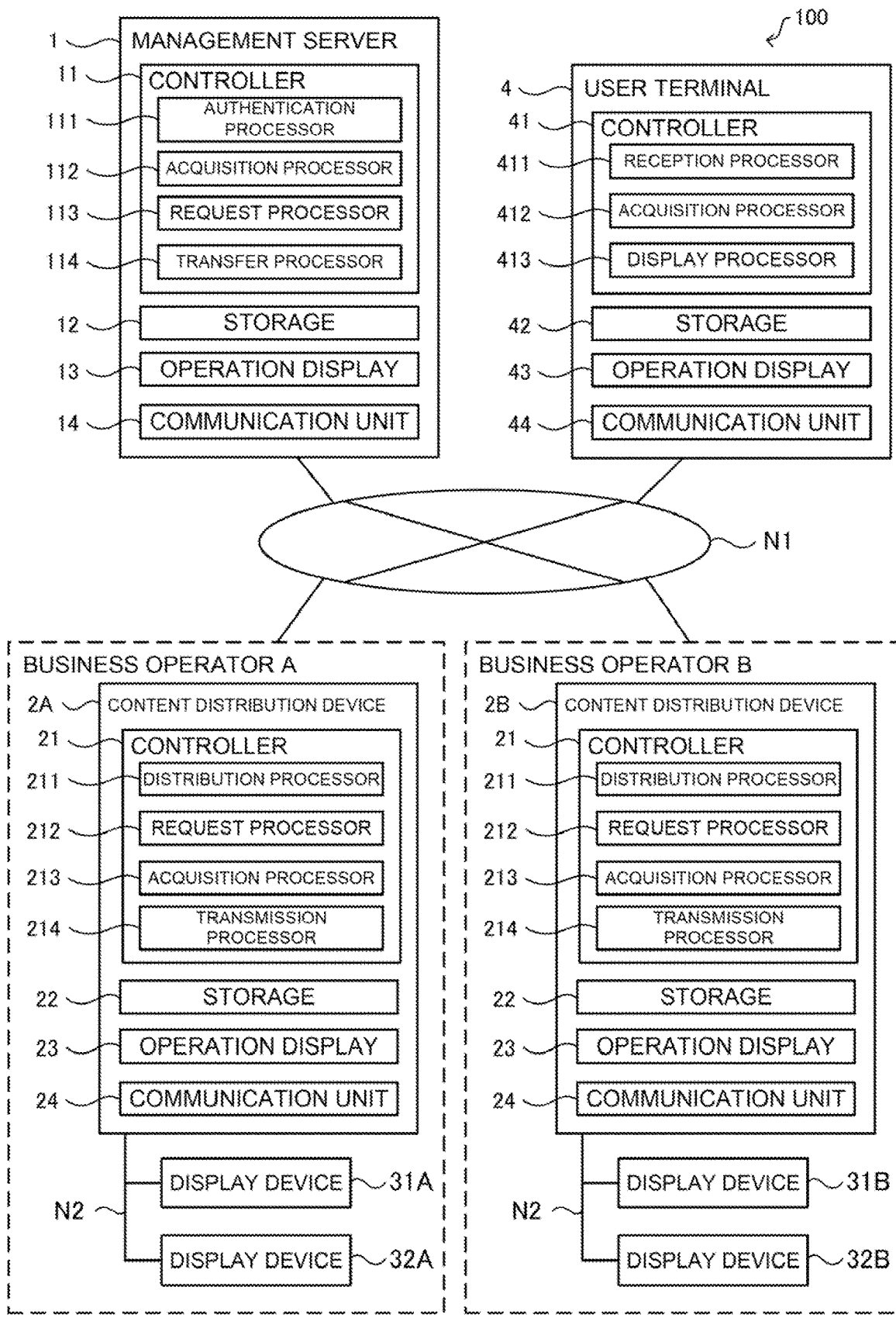
FIG. 2 is a block diagram illustrating a configuration of a content reproduction system according to the embodiment of the present disclosure.

As illustrated in FIG. 2, the management server 1 includes a controller 11, a storage 12, an operation display 13, and a communication unit 14. The management server 1 may be, for example, an information processing device such as a personal computer.

The communication unit 14 is a communication interface for connecting the management server 1 to the network N1 in a wired or wireless manner and for executing data communication between the content distribution device 2 and the user terminal 4 via the network N1 in accordance with a predetermined communication protocol.

The operation display 13 is a user interface including a display such as a liquid crystal display or an organic electroluminescence (EL) display for displaying various information, and an operating unit such as a mouse, a keyboard, or a touch panel that accepts operations. The operation display 13 accepts operations from, for example, an administrator of the management server 1.

The storage 12 is a non-volatile storage including hard disk drive (HDD), solid state drive (SSD), or a flash storage that stores various information. The storage 12 stores a control program such as a content reproduction program to cause the controller 11 to execute content reproduction processing (see FIG. 17) which will be described later. For example, the content reproduction program is temporarily recorded in a computer-readable recording medium such as a compact disk (CD) or digital versatile disc (DVD), read by a reader (not shown) such as the CD drive or the DVD drive of the management server 1, and stored in the storage 12. The content reproduction program may be distributed from a cloud server and stored in the storage 12.

The storage 12 also stores various information for reproducing the content. Specifically, the storage 12 stores data such as user information D1 concerning the user of the user terminal 4, business operator information D2 concerning the business operator, and affiliated group information D3 concerning the affiliated group to which the user belongs.

FIG. 3 illustrates an example of the user information D1. The user information D1 includes information such as a user ID, a username, a password, a business operator ID, and an affiliated group ID for each user of the user terminal 4. The user ID is the identification information of the user, and the username is the name of the user. The password is a unique passcode or the like set by the user. The user ID and the password are used in the login process of the business application. The business operator ID is the identification information of the business operator to which the user belongs. For example, if user U1 is an employee of xx Co., Ltd., the identification information "TN001" of xx Co., Ltd. is registered as the business operator ID. The affiliated group ID is the identification information of the affiliated group to which the user belongs. The affiliated group is the division to which the user belongs among the plurality of organizations (divisions) that constitute the business operator. For example, if the user U1 of xx Co., Ltd. belongs to its Hiroshima plant, the identification information "GID0001" of Hiroshima plant is registered as the affiliated group ID.

As illustrated in FIG. 3, the user information about individual users of a plurality of business operators is registered in the user information D1. In the user information D1, the user information of users who work for the same business operator may be registered. The users registered in the user information D1 have authority to use the business application.

FIG. 4 illustrates an example of the business operator information D2. The business operator information D2 includes information such as the business operator ID, the business operator name, and a distribution device address for each business operator. The business operator ID is the identification information of the business operator, and the business operator name is the name of the business operator. The distribution device address is the access information for accessing the content distribution device 2 owned by the business operator. For example, the management server 1 can transmit and receive data to and from the content distribution device 2A, which is installed at the business operator: xx Co., Ltd., by accessing the distribution device address "haishin001.xx.jp" of the content distribution device 2A.

As illustrated in FIG. 4, one distribution device address is registered to correspond to one content distribution device 2 for each business operator in the business operator information D2. In the business operator information D2, a plurality of distribution device addresses may be registered, each corresponding to each of the plurality of content distribution devices 2 of each business operator.

FIG. 5 illustrates an example of the affiliated group information D3. The affiliated group information D3 includes information such as an affiliated group ID, a group name, position information, and a business operator ID for each affiliated group. The affiliated group ID is the identification information of the affiliated group, and the affiliated group name is the name of the affiliated group. The location information is information that indicates the location of the affiliated group, such as latitude and longitude information.

Alternatively, some or all of the user information D1, the business operator information D2, and the affiliated group information D3 may be stored in a server accessible from the management server 1. In that case, the controller 11 of the management server 1 may acquire the information from the server and execute individual processing such as the content reproduction processing (see FIG. 17) which will be described later.

The controller 11 includes control devices such as a CPU, a ROM, and a RAM. The CPU is a processor that performs various arithmetic operations. The ROM is a non-volatile storage in which control program such as Basic Input/Output system (BIOS) and an operating system (OS) for causing the CPU to execute various kinds of processing are stored in advance. The RAM is a volatile or non-volatile storage that stores various information, and is used as a temporary storage memory (working area) for various kinds of processing executed by the CPU. The controller 11 controls the management server 1 by causing the CPU to execute various kinds of control programs stored in advance in the ROM or the storage 12.

Specifically, the controller 11 includes various processors such as an authentication processor 111, an acquisition processor 112, a request processor 113, and a transfer processor 114.

The controller 11 functions as various processors described above by executing various kinds of processing in accordance with the content reproduction program. Some or all of the processors included in the controller 11 may be formed by electronic circuits. The content reproduction program may be a program for making a plurality of processors function as the various processors described above.

The authentication processor 111 performs user authentication processing. For example, when a user enters user information (user ID and password) on the login screen (see FIG. 6) of the business application displayed on the user terminal 4, the authentication processor 111 acquires the user ID and the password and performs the authentication processing. If the user ID and the password are registered in the user information D1 (see FIG. 3), the authentication processor 111 authenticates the user and permits use of the business application. Upon authentication of the user by the authentication processor 111, the user terminal 4 displays the menu screen illustrated in FIG. 7 and accepts operations related to various tasks from the user. The authentication processor 111 is an example of a user information acquirer of the present disclosure.

The acquisition processor 112 acquires the business operator ID and the affiliated group ID corresponding to the user information (user ID and password) acquired by the authentication processor 111. Specifically, the acquisition processor 112 acquires the business operator ID and the affiliated group ID associated with the user ID (see FIG. 3).

The acquisition processor 112 also acquires a distribution device address (see FIG. 4) associated with the acquired business operator ID.

The request processor 113 accesses the distribution device address acquired by the acquisition processor 112 and requests a playlist (see FIG. 10) associated with the affiliated group ID acquired by the acquisition processor 112. Upon receipt of the request from the management server 1, the content distribution device 2 corresponding to the distribution device address acquires the information including the content file corresponding to the playlist, the display time of the content, and the reproduction schedule (display start time and display end time), and transmits the information to the management server 1.

The transfer processor 114 acquires, from the content distribution device 2, content (example of the first content of the present disclosure) corresponding to the user ID acquired by the authentication processor 111 and a reproduction schedule (example of the first reproduction schedule of the present disclosure) for playing the content. Specifically, the transfer processor 114 acquires the content corresponding to the user ID from a plurality of content items to be reproduced on each of the plurality of display devices 3. The transfer processor 114 acquires, from the plurality of content items to be reproduced on each of the plurality of display devices 3, the content reproduced on the display device 3 corresponding to the affiliated group of the user.

For example, the transfer processor 114 acquires, from the content distribution device 2, the information including the content file corresponding to the playlist, the display time, and the reproduction schedule information. The transfer processor 114 also transfers the information including the content file, the display time, and the reproduction schedule information acquired from the content distribution device 2 to the user terminal 4. The transfer processor 114 displays the content on the user terminal 4 in accordance with the reproduction schedule. The transfer processor 114 is an example of the content acquirer and the display processor in the present disclosure.

As described above, the management server 1 identifies the business operator (example of the affiliated group in the present disclosure) and the affiliated group in accordance with the user ID, and acquires the content reproduced on the display device 3 of the identified business operator and the affiliated group. The management server 1 acquires the content and the reproduction schedule in accordance with the user ID from the content distribution device 2A or the content distribution device 2B, and displays the content on the user terminal 4 in accordance with the reproduction schedule.

Content Distribution Device 2

As illustrated in FIG. 1, the content distribution device 2A installed at the business operator A distributes content to the display devices 31A and 32A. The content distribution device 2B installed at the business operator B distributes content to the display devices 31B and 32B. The content distribution devices 2A and 2B have the same configuration. In the following, the content distribution devices 2A and 2B will simply be referred to as the content distribution device 2.

As illustrated in FIG. 2, the content distribution device 2 includes a controller 21, a storage 22, an operation display 23, and a communication unit 24, and so on. The content distribution device 2 may be an information processing device such as a personal computer.

The communication unit 24 is a communication interface for connecting the content distribution device 2 to the network N1 in a wired or wireless manner and for executing data communication with the management server 1 via the network N1 in accordance with a predetermined communication protocol. The communication unit 24 is also a communication interface for connecting the content distribution device 2 to the network N2 in a wired or wireless manner and for executing data communication with the display device 3 via the network N2 in accordance with a predetermined communication protocol.

The operation display 23 is a user interface including a display such as a liquid crystal display or an organic EL display for displaying various information, and an operating unit such as a mouse, a keyboard, or a touch panel that accepts operations. The operation display 23 accepts operations from, for example, an administrator of the content distribution device 2.

The storage 22 is a non-volatile storage such as HDD, SSD, or a flash storage that stores various information. The storage 22 stores a control program such as a content reproduction program to cause the controller 21 to execute the content reproduction processing (see FIG. 17) which will be described later. For example, the content reproduction program is temporarily recorded in a computer-readable recording medium such as a CD or a DVD, read by a reader (not shown) such as the CD drive or the DVD drive of the content distribution device 2, and stored in the storage 22. The content reproduction program may be distributed from a cloud server and stored in the storage 22.

The storage 22 also stores various information for reproducing the content. Specifically, the storage 22 stores data such as display device information D4 concerning the display device 3, schedule information D5 for reproducing the content, and playlist information D6 concerning the playlist of the content.

FIG. 8 illustrates an example of display device information D4. The display device information D4 includes information such as a display device ID, an Internet Protocol (IP) address, and an affiliated group ID for each display device 3. The display device ID is the identification information (e.g., device number) of the display device 3. The content distribution device 2 stores the display device information D4 concerning one or more display devices 3 connected to the content distribution device 2. FIG. 8 illustrates an example of the display device information D4 concerning the display devices 31A and 32A connected to the content distribution device 2A.

FIG. 9 illustrates an example of the schedule information D5. The schedule information D5 includes information such as a date, a start time, an end time, a playlist ID, and a distribution destination (affiliated group) ID for each playlist. The playlist ID is the identification information of the playlist including information of the content file and the display time (required time) of the content. The date, the start time, and the end time are information (schedule information) of the reproduction schedule to reproduce the content. The destination ID is the identification information indicating the affiliated group of the destination address of the playlist and the reproduction schedule. The content distribution device 2 stores the schedule information D5 corresponding to the content distributed by the content distribution device 2. FIG. 9 illustrates an example of the schedule information D5 corresponding to the content distributed by the content distribution device 2A.

FIG. 10 illustrates an example of playlist information D6. The playlist information D6 includes information such as a playlist ID, a content file, and display time (required time) for each playlist. Each playlist ID is associated with one or more content files and the display time corresponding to the content files. Each content distribution device 2 stores the playlist information D6 corresponding to the content distributed by the content distribution device 2. FIG. 10 illustrates an example of the playlist information D6 corresponding to the content distributed by the content distribution device 2A.

The storage 22 of each content distribution device 2 stores the display device information D4, the schedule information D5, and the playlist information D6. For example, when the content to be distributed and the reproduction schedule are fixed, the administrator of each business operator registers the fixed content and reproduction schedule in the content distribution device 2 installed at the business operator.

Alternatively, some or all of the display device information D4, the schedule information D5, and the playlist information D6 may be stored in a server accessible from the content distribution device 2. In that case, the controller 21 of the content distribution device 2 may acquire the information from the server and execute processing such as the content reproduction processing (see FIG. 17) which will be described later. For example, some or all of the display device information D4, the schedule information D5, and the playlist information D6 corresponding to each content distribution device 2 may be stored in the management server 1.

The controller 21 includes control devices such as a CPU, a ROM, and a RAM. The CPU is a processor that performs various arithmetic operations. The ROM is a non-volatile storage in which control programs such as BIOS and an OS for causing the CPU to execute various kinds of processing are stored in advance. The RAM is a volatile or non-volatile storage that stores various information, and is used as a temporary storage memory (working area) for various kinds of processing executed by the CPU. The controller 21 controls the content distribution device 2 by causing the CPU to execute various kinds of control programs stored in advance in the ROM or the storage 22.

Specifically, the controller 21 includes various processors such as a distribution processor 211, a request processor 212, an acquisition processor 213, and a transmission processor 214.

The controller 21 functions as the various processors described above by executing various kinds of processing in accordance with the content reproduction program. Some or all of the processors included in the controller 21 may be formed by electronic circuits. The content reproduction program may be a program for making a plurality of processors function as the various processors described above.

The distribution processor 211 distributes the content to the display device 3. Specifically, the distribution processor 211 distributes information including the reproduction schedule, the content file, and the display time to a predetermined display device 3 in accordance with the schedule information D5 (see FIG. 9). Upon acquisition of the information from the content distribution device 2, the display device 3 reproduces the content in accordance with the reproduction schedule.

FIG. 11 illustrates an example of content displayed on the display device 31A. FIG. 12 also illustrates an example of content displayed on the display device 32A.

The request processor 212 receives, from the management server 1, a request for a playlist of content corresponding to the affiliated group to which the user belongs. Upon receipt of the request, the request processor 212 determines whether a reproduction schedule corresponding to the date (current day) of receipt of the request is registered in the schedule information D5 (see FIG. 9). If the reproduction schedule corresponding to the current date is not registered in the schedule information D5, the request processor 212 transmits a response to that effect to the management server 1.

Upon receipt of the request, the request processor 212 also determines whether the affiliated group ID indicating the affiliated group is registered in the schedule information D5 (see FIG. 9) in the reproduction schedule corresponding to the date (current day) of receipt of the request. If the affiliated group ID is not registered in the schedule information D5, the request processor 212 transmits a response to that effect to the management server 1.

Upon receipt of the response from the content distribution device 2, the management server 1 transmits the specified information corresponding to the response to the user terminal 4. The specified information is, for example, a message indicating that there is no content to be displayed on the user terminal 4, or a message indicating the start time (scheduled start time) to start the display of the content. In this way, the management server 1 causes the display device 3 to display the content on the user terminal 4 while the display device 3 reproduces the content, and to display the specified information on the user terminal 4 when the display device 3 does not reproduce the content.

The acquisition processor 213 acquires, from the schedule information D5 (see FIG. 9), a reproduction schedule for the day and a playlist ID associated with the affiliated group ID. In addition, the acquisition processor 213 acquires, from the playlist information D6 (see FIG. 10), the content file and display time information associated with the playlist ID.

The transmission processor 214 transmits the information of the reproduction schedule (display start time and display end time), the content file, and the display time acquired by the acquisition processor 213 to the management server 1.

User Terminal 4

As illustrated in FIG. 2, the user terminal 4 includes a controller 41, a storage 42, an operation display 43, and a communication unit 44. The user terminal 4 is, for example, an information processing device such as a smartphone, a mobile phone, a tablet device, or a personal computer.

The communication unit 44 is a communication interface for connecting the user terminal 4 to the network N1 in a wired or wireless manner and for executing data communication with the management server 1 via the network N1 in accordance with a predetermined communication protocol.

The operation display 43 is a user interface including a display such as a liquid crystal display or an organic EL display for displaying information such as various web pages, and an operating unit such as a mouse, a keyboard, or a touch panel that accepts operations. The operation display 43 displays a screen executed by the business application. The operation display 43 is formed by, for example, the touch panel, and accepts selection operation (touch operation) of the user on various screens or the like.

The storage 42 is a non-volatile storage such as HDD, SSD or flash storage that stores various kinds of information. For example, the storage 42 stores a control program such as a browser program. Specifically, the browser program is a control program for causing the controller 41 to perform communication processing with an external device such as the management server 1 according to a communication protocol such as the Hypertext Transfer Protocol (HTTP). The browser program can be a dedicated application for executing the communication processing with the management server 1 in accordance with a predetermined communication protocol.

The controller 41 includes control devices such as a CPU, a ROM, and a RAM. The CPU is a processor that performs various arithmetic operations. The ROM is a non-volatile storage in which control programs such as BIOS and an OS for causing the CPU to execute various kinds of processing are stored in advance. The RAM is a volatile or non-volatile storage that stores various information, and is used as a temporary storage memory (working area) for various kinds of processing executed by the CPU. The controller 41 controls the user terminal 4 by causing the CPU to execute various kinds of control programs stored in advance in the ROM or the storage 42.

Specifically, the controller 41 includes various processors such as a reception processor 411, an acquisition processor 412, and a display processor 413. The controller 41 functions as the various processors described above by executing various kinds of processing in accordance with the control program. Also, some or all of the processors included in the controller 41 may be formed by electronic circuits. The control program may be a program for making the plurality of processors function as the various processors described above.

The reception processor 411 accepts various operations of the user. For example, when the user enters user information (user ID and password) on the login screen of the business application displayed on the user terminal 4 (see FIG. 6), the reception processor 411 accepts the entry operation. In addition, for example, when the user performs a selection operation to select a desired task on a menu screen displayed on the user terminal 4 (see FIG. 7), the reception processor 411 accepts the selection operation. Here, the user selects "signage information (remote display)".

The acquisition processor 412 acquires various information from the management server 1. Specifically, the acquisition processor 412 acquires from the management server 1 information on the content to be distributed to the affiliated group to which the user belongs. For example, when user U1 of xx Co., Ltd. belongs to the Hiroshima plant (affiliated group ID "GID0001"), the acquisition processor 412 of the user terminal 4 of user U1 acquires from the management server 1 the content file, the display time, and the reproduction schedule corresponding to the affiliated group ID "GID0001".

The acquisition processor 412 acquires such specified information from the management server 1 if the reproduction schedule of the day is not registered in the schedule information D5 or the affiliated group ID is not registered in the schedule information D5. Specifically, the acquisition processor 412 acquires, from the management server 1, a message indicating that there is no content to be displayed on the user terminal 4 or a message indicating the start time (scheduled start time) of the start of the content.

Figure 13:
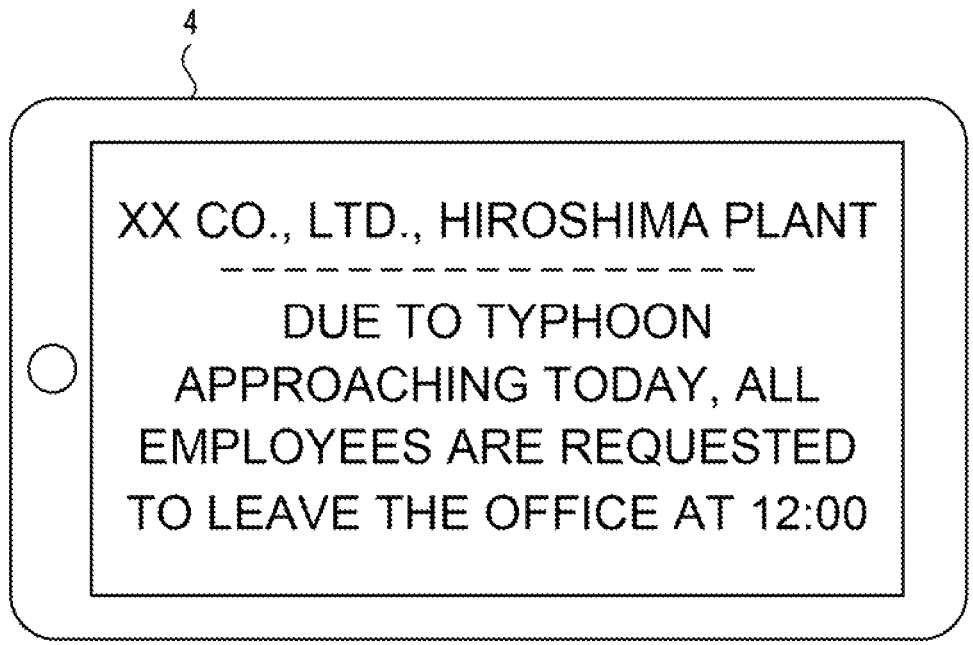
FIG. 13 illustrates an example of the display screen of the user terminal according to the embodiment of the present disclosure.
Figure 14:
FIG. 14 illustrates an example of the display screen of the user terminal according to the embodiment of the present disclosure.

The display processor 413 causes the operation display 43 to display various information. For example, as illustrated FIG. 13, the display processor 413 causes the operation display 43 to display the content according to the reproduction schedule. In a case where a plurality of content files is associated with the playlist ID (see FIG. 10), the display processor 413 displays the plurality of content while switching the content for each display time registered. For example, the display processor 413 displays the content repeatedly by switching between the content illustrated in FIG. 13 and the content illustrated in FIG. 14 for each display time (see FIG. 10).

Figure 15:
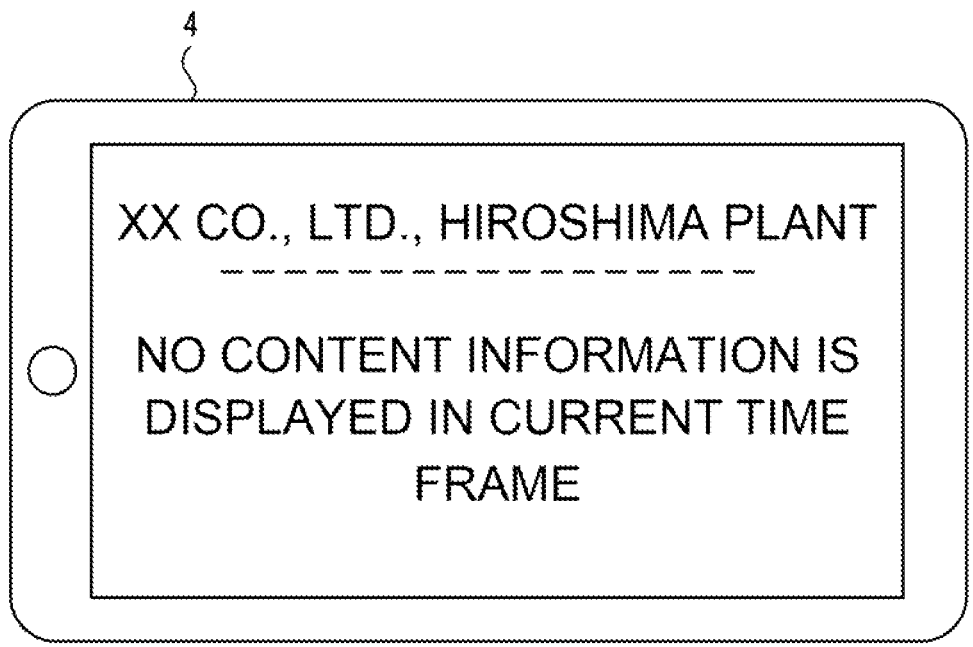
FIG. 15 illustrates an example of the display screen of the user terminal according to the embodiment of the present disclosure.
Figure 16:
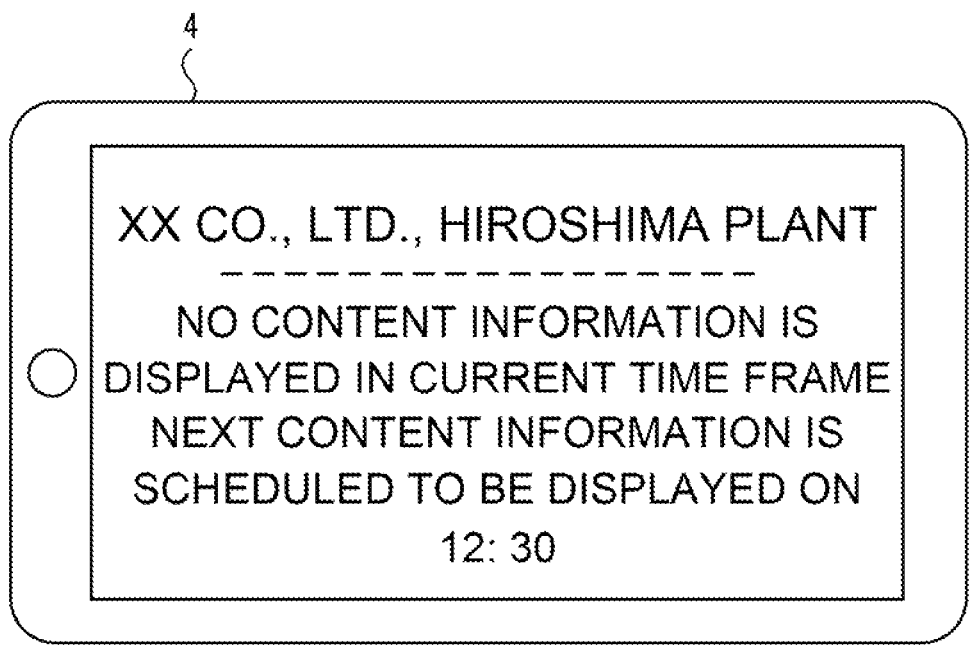
FIG. 16 illustrates an example of the display screen of the user terminal according to the embodiment of the present disclosure.

Alternatively, as illustrated in FIG. 15, the display processor 413 causes the operation display 43 to display, for example, a message indicating that there is no content to be displayed on the user terminal 4. Alternatively, as illustrated in FIG. 16, the display processor 413 causes the operation display 43 to display, for example, a message indicating the start time (scheduled start time) to start display of the content. When the display processor 413 displays the start time, it causes the operation display 43 to automatically display the content when the current time reaches the start time.

Alternatively, the controller 41 may function as a browser processor by executing processing according to the browser program stored in the storage 42. The browser processor can display, on the operation display 43, a web page provided from the management server 1 via the network N1, and execute browser processing to enter operations performed on the operation display 43 to the management server 1. That is, the user terminal 4 can function as an operation terminal for the management server 1 when the browser program is executed by the controller 41.

For example, in the user terminal 4, when the user operation is performed to request access to a predetermined URL corresponding to the website of a business support service provided by the management server 1, the controller 41 acquires data of the web page of the website from the management server 1 and displays the web page on the operation display 43.

Content Reproduction Processing

Figure 17:
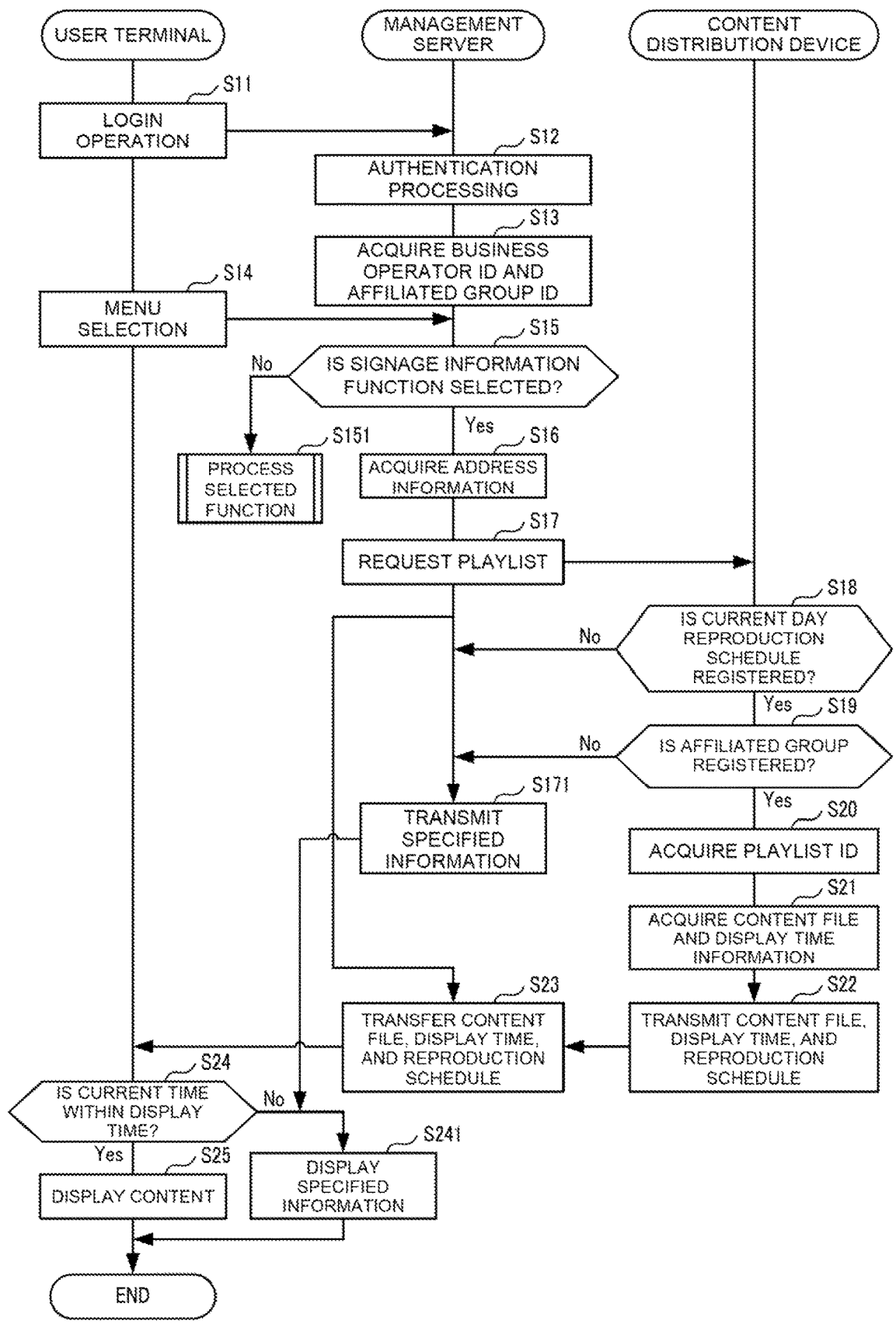
FIG. 17 is a flowchart for explaining an example of a procedure of content reproduction processing performed in the content display system according to the embodiment of the present disclosure.

By referring to FIG. 17, an example of a procedure of content reproduction processing executed by the content reproduction system 100 is described.

The present disclosure can be construed as a disclosure of a content reproduction method for executing one or more steps included in the content reproduction processing. In the content reproduction processing described here, one or more steps may be omitted as appropriate. The execution order of steps in the content reproduction processing may differ to the extent that similar effects are produced. The description below will be provided by taking, as an example, a case where the controller 11 of the management server 1, the controller 21 of the content distribution device 2, and the controller 41 of the user terminal 4 execute the steps of the content reproduction processing. Alternatively, a plurality of processors may execute these steps in a distributed manner.

Figure 6:
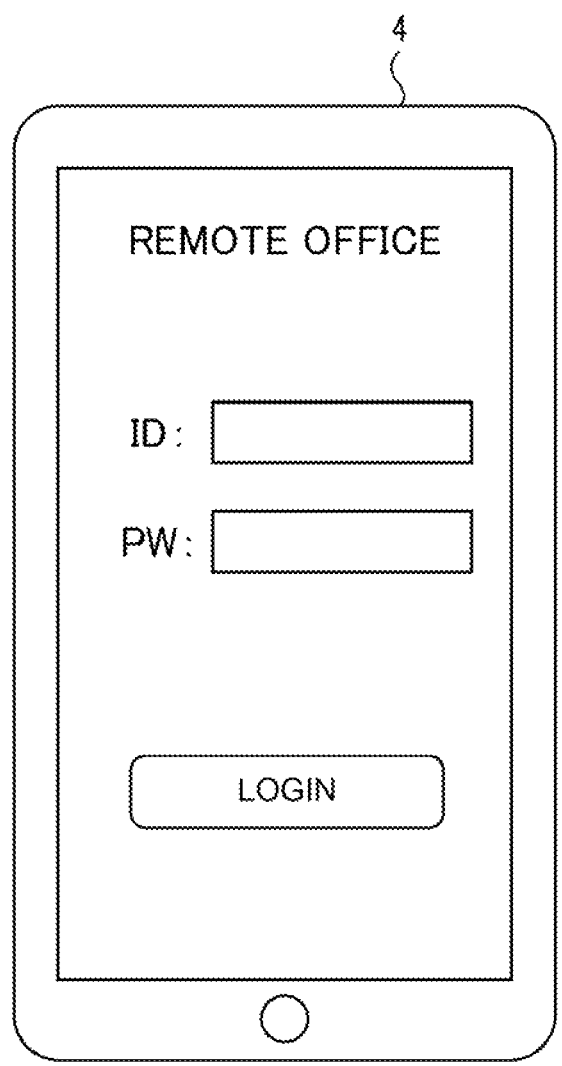
FIG. 6 illustrates an example of a display screen of a user terminal according to the embodiment of the present disclosure.

First, in step S11, the controller 41 of the user terminal 4 accepts the entry operation (login operation) when the user enters the user information (user ID and password) on the login screen of the business application displayed on the user terminal 4 (see FIG. 6).

In step S12, the controller 11 of the management server 1 acquires the user information and performs authentication processing. Step S12 is an example of a user information acquisition step of the present disclosure.

In step S13, the controller 11 acquires the business operator ID and the affiliated group ID associated with the user ID (see FIG. 3).

Figure 7:
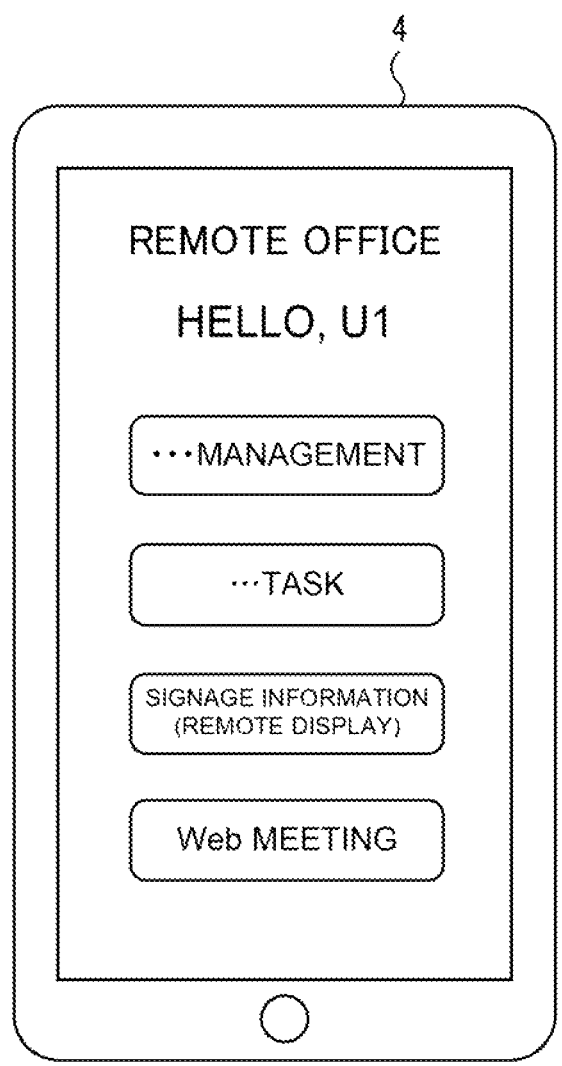
FIG. 7 illustrates an example of a display screen of the user terminal according to the embodiment of the present disclosure.

In step S14, the controller 41 of the user terminal 4 accepts the selection operation when the user selects a desired task on the menu screen displayed on the user terminal 4 (see FIG. 7).

In step S15, the controller 11 of the management server 1 determines whether "signage information (remote display)" is selected from a plurality of menu items. When the "signage information (remote display)" is selected (S15: Yes), the process shifts to step S16. On the other hand, if another menu item is selected (S15: No), the process shifts to step S151.

In step S151, the controller 41 of the user terminal 4 executes processing corresponding to the selected other menu item.

In step S16, the controller 11 acquires a distribution device address associated with the business operator ID (see FIG. 4).

In step S17, the controller 11 accesses the distribution device address and requests the playlist associated with the affiliated group ID (see FIG. 10).

In step S18, upon receipt of the request, the controller 21 of the content distribution device 2 determines whether the reproduction schedule corresponding to the date (current day) of receipt of the request is registered in the schedule information D5 (see FIG. 9). If the reproduction schedule is registered in the schedule information D5 (S18: Yes), the process shifts to step S19. On the other hand, if the reproduction schedule is not registered in the schedule information D5 (S18: No), the process shifts to step S171.

In step S19, the controller 21 determines whether the affiliated group ID indicating the affiliated group corresponding to the date (current day) of receipt of the request is registered in the reproduction schedule in the schedule information D5 (see FIG. 9). If the affiliated group ID is registered in the schedule information D5 (S19: Yes), the process shifts to step S20. On the other hand, if the affiliated group ID is not registered in the schedule information D5 (S19: No), the process shifts to step S171.

In step S171, the controller 11 of the management server 1 transmits specified information to the user terminal 4. Specifically, the controller 11 transmits, to the user terminal 4, a message indicating that there is no content to be displayed on the user terminal 4, or a message indicating a start time (scheduled start time) to start displaying the content.

In step S20, the controller 21 of the content distribution device 2 acquires the reproduction schedule of the current day and the playlist ID associated with the affiliated group ID from the schedule information D5 (see FIG. 9).

In step S21, the controller 21 acquires, from the playlist information D6 (see FIG. 10), the content file and display time information associated with the playlist ID.

In step S22, the controller 21 transmits the information on the reproduction schedule (display start time and display end time), the content file, and the display time to the management server 1.

In step S23, the controller 11 of the management server 1 transfers, to the user terminal 4, the information on the content file, the display time, and the reproduction schedule acquired from the content distribution device 2. The controller 41 of the user terminal 4 receives the information on the content file, the display time, and the reproduction schedule from the management server 1. Step S23 is an example of a content acquisition step and a display step in the present disclosure.

In step S24, the controller 41 of the user terminal 4 determines whether the current time is within the time frame from the start time to the end time of the reproduction schedule. If the current time is within the time frame (S24: Yes), the process shifts to step S25. On the other hand, if the current time is outside the time frame (S24: No), the process shifts to step S241.

In step S25, the controller 41 of the user terminal 4 causes the operation display 43 to display the content in accordance with the reproduction schedule. In step S241, the controller 41 causes the operation display 43 to display the specified information.

Alternatively, when the current time is not within the time frame from the start time to the end time of the reproduction schedule (S24: No), the controller 41 of the user terminal 4 determines whether the content reproduction schedule on or after the current time is registered. If the content reproduction schedule on or after the current time is registered, the controller 41 causes the operation display 43 to display a message indicating the start time to start reproduction of the content (scheduled start time), as illustrated in FIG. 16. If no content reproduction schedule on or after the current time is registered, the controller 41 causes the operation display 43 to display a message indicating that there is no content to be displayed on the user terminal 4, as illustrated in FIG. 15.

As described above, the content reproduction system 100 according to the present embodiment acquires user information from the user terminal 4, and acquires content corresponding to the user information and the reproduction schedule for reproducing the content. Then, the content reproduction system 100 causes the user terminal 4 to display the content in accordance with the reproduction schedule. This allows, for example, the user located at a remote place away from the installed location of the display device 3 to use the user terminal 4 to view the content reproduced on the display device 3 installed at the predetermined location of the business facility.

The present disclosure is not limited to the above-described embodiment. In another embodiment, the controller 11 of the management server 1 may acquire the content in accordance with the current position of the user from a plurality of content items to be reproduced on each of the plurality of display devices 3. Specifically, the controller 11 acquires the location information from the logged-in user terminal 4 to acquire the current position. Then the controller 11 acquires the affiliated group ID that matches the current position of the user terminal 4 by referring to the affiliated group information D3 (see FIG. 5). The controller 11 also acquires the business operator ID corresponding to the user ID by referring to the user information D1 (see FIG. 3). The controller 11 acquires the distribution device address associated with the business operator ID by referring to the business operator information D2 (see FIG. 4). The controller 11 accesses the distribution device address and requests the playlist associated with the affiliated group ID (see FIG. 10).

Upon receipt of the request from the management server 1, the content distribution device 2 corresponding to the distribution device address acquires the information on the content file, the display time, and the reproduction schedule corresponding to the playlist, and transmits the information to the management server 1. When the information is received from the content distribution device 2, the controller 11 transfers the information to the user terminal 4. The user terminal 4 displays the content on the operation display 43 in accordance with the reproduction schedule. The user terminal 4 can, therefore, display the content corresponding to the current position of the user, so that the user can acquire appropriate content information.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A content reproduction system that reproduces content on a at least one display device installed at a predetermined location in accordance with a predetermined reproduction schedule, comprising:

a user information acquiring circuit that acquires user information from a user terminal;

a content acquiring circuit that acquires first content corresponding to the user information acquired by the user information acquiring circuit, and a first reproduction schedule for reproducing the first content; and a display circuit that causes the user terminal to display the first content acquired by the content acquiring circuit, in accordance with the first reproduction schedule, wherein while the at least one display device is reproducing the first content based on the first reproduction schedule, the display circuit causes a user terminal of a user who belongs to an affiliated group associated with the display device, to display the first content based on the first reproduction schedule; wherein while the display device is not reproducing the first content, the display circuit causes the user terminal of the user who belongs to the affiliated group associated with the display device, to display a message indicating that there is no content to be displayed on the user terminal, or a message indicating a start time to start displaying the first content.

2. The content reproduction system according to claim 1, further comprising:

a plurality of display devices located at different locations and reproducing different content items, wherein the content acquiring circuit acquires the first content from a plurality of content items to be reproduced on each of the plurality of display devices.

3. The content reproduction system according to claim 2, wherein each of the plurality of the display devices is installed in association with a corresponding affiliated group of a user, and the content acquiring circuit acquires the first content to be reproduced on the display device corresponding to the affiliated group of the user from the plurality of the content items to be reproduced on the plurality of the display devices.

4. The content reproduction system according to claim 2, wherein the content acquiring circuit acquires the first content in accordance with a current position of the user from the plurality of the content items to be reproduced on the plurality of the display devices.

5. The content reproduction system according to claim 1, wherein the display circuit causes the user terminal to display the first content while the display device reproduces the first content, and to display specified information when the display device is reproducing no content.

6. The content reproduction system according to claim 5, wherein the specified information comprising a message indicating that there is no content to be displayed on the user terminal, or a message indicating a start time to start display of the first content.

7. The content reproduction system according to claim 1, further comprising:

a first content distribution device that distributes content to at least one first display devices included in a first group;

a second content distribution device that distributes content to at least one second display devices included in a second group; and a management server that manages the first content distribution device and the second content distribution device, wherein the management server acquires the first content and the first reproduction schedule according to the user information from the first content distribution device or the second content distribution device, and causes the user terminal to display the first content in accordance with the first reproduction schedule.

8. The content reproduction system according to claim 7, wherein the first group includes the first display device of a first affiliated group installed at a first site and the first display device of a second affiliated group installed at a second site, the second group includes the second display device of a third affiliated group installed at a third site and the second display device of a fourth affiliated group installed at a fourth site, and the management server further identifies a group and an affiliated group in accordance with the user information, and acquires the first content to be reproduced on the display device of the identified group and the identified affiliated group.

9. The content reproduction system according to claim 1, wherein the first reproduction schedule includes information of: a start time to start displaying the first content; an end time to end displaying the first content; a playlist; and the affiliated group.

10. A content reproduction method for reproducing content on a display device installed at a predetermined location in accordance with a predetermined reproduction schedule, the content reproduction method causing one or more processors to execute operations including:

acquiring user information from a user terminal;

acquiring first content corresponding to the user information acquired in the acquiring of the user information, and a first reproduction schedule for reproducing the first content; and displaying the first content acquired in the acquiring of the content on the user terminal according to the first reproduction schedule, wherein while the display device is reproducing the first content based on the first reproduction schedule, the display circuit causes a user terminal of a user who belongs to an affiliated group associated with the display device, to display the first content based on the first reproduction schedule; wherein while the display device is not reproducing the first content, the display circuit causes the user terminal of the user who belongs to the affiliated group associated with the display device, to display a message indicating that there is no content to be displayed on the user terminal, or a message indicating a start time to start displaying the first content.

11. A non-transitory computer-readable storage medium with a content reproduction program recorded thereon, causing a display device installed at a predetermined location to reproduce content in accordance with a predetermined reproduction schedule, and causing one or more processors to execute operations including:

acquiring user information from a user terminal;

acquiring first content corresponding to the user information acquired in the acquiring of the user information, and a first reproduction schedule for reproducing the first content; and displaying the first content acquired in the acquiring of the content on the user terminal according to the first reproduction schedule, wherein while the display device is reproducing the first content based on the first reproduction schedule, the display circuit causes a user terminal of a user who belongs to an affiliated group associated with the display device, to display the first content based on the first reproduction schedule; wherein while the display device is not reproducing the first content, the display circuit causes the user terminal of the user who belongs to the affiliated group associated with the display device, to display a message indicating that there is no content to be displayed on the user terminal, or a message indicating a start time to start displaying the first content.

* * * * *